US007247397B2

(12) United States Patent
Hegel

(10) Patent No.: US 7,247,397 B2
(45) Date of Patent: Jul. 24, 2007

(54) THERMALLY STABLE PERFLUOROPOLYETHER LUBRICANT FOR RECORDING MEDIA

(75) Inventor: Ramon F. Hegel, North St. Paul, MN (US)

(73) Assignee: Imation Corp., Oakdale, MN (US)

( * ) Notice: Subject to any disclaimer, the term of this patent is extended or adjusted under 35 U.S.C. 154(b) by 572 days.

(21) Appl. No.: 10/730,843

(22) Filed: Dec. 9, 2003

(65) Prior Publication Data
US 2005/0123855 A1 Jun. 9, 2005

(51) Int. Cl.
G11B 5/65 (2006.01)
(52) U.S. Cl. .................................. 428/835.8
(58) Field of Classification Search ............. 428/835.8
See application file for complete search history.

(56) References Cited

U.S. PATENT DOCUMENTS

| 4,882,197 | A | 11/1989 | Matsudaira et al. | |
|---|---|---|---|---|
| 5,049,410 | A | 9/1991 | Johary et al. | |
| 5,112,662 | A | 5/1992 | Ng | |
| 5,143,787 | A | 9/1992 | Frew et al. | |
| 5,527,479 | A | 6/1996 | Nagataki et al. | |
| 6,001,479 | A | 12/1999 | Yokosawa et al. | |
| 6,617,011 | B2 * | 9/2003 | Wu et al. | 428/216 |
| 6,778,753 | B2 * | 8/2004 | Blomquist | 385/143 |
| 2004/0057343 | A1 * | 3/2004 | Murakami et al. | 369/13.41 |

OTHER PUBLICATIONS

"Improved Surface Adhesion and Coverage of Perfluoropolyether Lubricants Following Far-UV Irradiation," Saperstein et al., American Chemical Society, Langmuir 1990, vol. 6, 1522-1524.
"Frictional Properties of Novel Lubricants for Magnetic Thin Film Media," Kondo et al., IEEE Transactions on Magnetics, vol. 26, No. 5, Sep. 1990, pp. 2691-2693.
"Lubricant Performance in Magnetic Thin Film Disks with Carbon Overcoat—Part II: Durability," Streator et al.; Journal of Tribology, Transactions of the ASME, Jan. 1991, vol. 113, pp. 32-37.
"Effect of Relative Humidity on Friction Behavior of the Head/Disk Interface," Tian et al., IEEE Transactions on Magnetics, vol. 28, No. 5, Sep. 1992, pp. 2530-2532.
"Effect of Relative Humidity on Lubricant Performance," Merchant et al., IEEE Transactions on Magnetics, vol. 29, No. 6, Nov. 1993, pp. 3930-3932.
"Tribology of thin-film media in both flying and sliding modes," Azarian et al.; Wear, 168 (1993), pp. 59-76.
"The Mechanism of Ultraviolet Bonding of Perfluoropolyether Lubricants," Vurens et al., IEEE Transactions of Magnetics, vol. 29, No. 1, Jan. 1993, pp. 282-285.
"Enhanced tribological performance of rigid disk by using chemically bonded lubricant," Lee et al., J. Vac. Sci. Technol. A., vol. 11, No. 3, May/Jun. 1993, pp. 711-714.
"Adsorption of Perfluoro-Polyethers on Carbon Surfaces," Yanagisawa, Presented at ASME/Style Tribology Conference in Lahaina, Hawaii, Oct. 16-20, 1994, pp. 25-32.

"Lubricant Bonding Via Hydrogen Bond Network," Sano et al., IEEE Transactions on Magnetics, vol. 30, No. 6, Nov. 1994, pp. 4140-4142.
"Spreading characteristics of thin liquid films of perfluoropolyalkylethers on solid surfaces. Effects of chain-end functionality and humidity," Min et al., Tribology Letters 1 (1995), pp. 225-232.
"Dip-Coating of Ultra-Thin Liquid Lubricant and Its Control for Thin-Film Magnetic Hard Disks," Gao et al., IEEE Transactions on Magnetics, vol. 31, No. 6, Nov. 1995, pp. 2982-2984.
"Lubrication of modified perfluoropolyether on magnetic media," Kondo et al., Journal of Magnetism and Magnetic Materials 155 (1996), pp. 332-334.
"Fluoroether Bonding to Carbon Overcoats," Cornaglia et al., TRIB-Vol. 6, Tribology of Contact/Near-Contact Recording for Ultra High Density Magnetic Storage ASME 1996, pp. 39-45.
"Effect of double bonds on friction in the boundary lubrication of magnetic thin film media," Kondo, Wear 202 (1997), pp. 149-153.
"Effect of bonded lubricant films on the tribological performance of magnetic thin-film rigid disks," Zhao et al., Wear 202 (1996), pp. 50-59.
"The Interaction of Perfluoro-Polyether Lubricant with Hydrogenated Carbon," Wang et al., IEEE Transactions on Magnetics, vol. 32, No. 5, Sep. 1996, pp. 3777-3779.
"Behavior of Perfluoropolyether in Particulate Magnetic Recording Media," Nishida et al., IEEE Transactions on Magnetics, vol. 32, No. 5, Sep. 1996, pp. 3738-3740.
"Molecular Orientation of PFPE Lubricant Films and Its Quantification," Gao et al., IEEE Transactions on Magnetics, vol. 33, No. 5, Sep. 1997, pp. 3118-3120.
"Acoustic Emission Study of Lubricant Effect on Proximity Contact Recording," Liu et al., IEEE Transactions on Magnetics, vol. 33, No. 5, Sep. 1997, pp. 3160-3162.
"Surface and lubricant/overcoat interface properties of the rigid disks after corrosion," Huang et al., IEEE Transactions on Magnetics, vol. 33, No. 5, Sep. 1997, pp. 3154-3156.

* cited by examiner

Primary Examiner—Holly Rickman
(74) Attorney, Agent, or Firm—Eric D. Levinson

(57) ABSTRACT

The invention provides a lubricant useful in magnetic recording media and optical recording media comprising a functionalized perfluoropolyether comprising multiple acrylate endgroups. More specifically, the lubricant of the invention is a functionalized perfluoropolyether comprising at least about two acrylate groups. In one embodiment, the lubricant of the invention is a functionalized perfluoropolyether comprising a perfluoropolyether tetraacrylate. A magnetic recording medium is also provided comprising a thin metal magnetic recording layer, said layer having a coating of the functionalized perfluoropolyether lubricant comprising at least about three acrylate end groups. An optical recording medium including the functionalized perfluoropolyether lubricant includes at least one magneto-optical layer disposed between two protective layers further disposed between two substrate layers having interior and exterior surfaces, the exterior surface of at least one substrate layer bearing thereon a functionalized perfluoropolyether lubricant comprising a perfluoropolyether tetraacrylate.

6 Claims, No Drawings

THERMALLY STABLE PERFLUOROPOLYETHER LUBRICANT FOR RECORDING MEDIA

THE FIELD OF THE INVENTION

The present invention relates generally to a perfluoropolyether lubricant material, and specifically to a thermally stable lubricating material which is useful in magnetic recording media such as magnetic tape, and in optical recording media, and the media employing such a lubricant.

BACKGROUND OF THE INVENTION

Magnetic recording media are widely used in audio tapes, video tapes, computer tapes, disks and the like. Magnetic media may use thin metal layers as the recording layers, or may comprise coatings containing magnetic particles as the recording layer. The former type of recording media employs metals such as cobalt, cobalt chrome, cobalt nickel, cobalt chrome platinum, and other cobalt alloys. The latter type of recording media employs particulate materials such as ferromagnetic iron oxides, chromium oxides, ferromagnetic alloy powders and the like dispersed in binders and coated on a substrate. In general terms, magnetic recording media generally comprise a magnetic layer coated onto at least one side of a non-magnetic substrate.

In media based on a thin metallic magnetic recording layer, such as a magnetic cobalt alloy, the overall media construction will generally include several thin films coated in sequence which form a "thin film stack." The first thin film stack layers coated generally function to provide a combination of adhesion, topographical texture, and crystalline texture. These layers are then followed by one or more magnetic thin films which do the actual information storage. The magnetic thin films are followed by one or more coatings which provide environmental stability, hardness, and compatibility with the subsequently coated lube. The lube layer constitutes the final layer of the thin film media.

Optical recording media, such as magneto-optical disks, store information on a thin film of magneto-optical material disposed between two protective layers. The basic principal of operation is to use a laser to locally raise the temperature of the magneto-optical layer to near the Curie point and switch the direction of the local magnetization to the direction of a recording magnetic field applied to the disk. The two protective layers enclose the magneto-optical material to protect it from corrosion, and are formed from materials such as silicon nitride, silicon oxide, or aluminum nitride dielectrics. The read/write head of a recording mechanism glides above the disk surface. Lubricants are disposed on the surface to protect both the disk head and the disk surface from damage. The lubricants reduce friction between the disk head and surface and they enhance the wear resistance of the disk.

Lubricants useful for both types of recording media have been organic lubricants such as fatty acid esters, silicones, and perfluoropolyesters such as polytetrafluoro-ethylene (PTFE). However, conventional lubricants may degrade when exposed to high temperatures forming sludge on the surface, and migration of the lubricants due to centrifugal force depletes the lubricant from the surface of the disk. Optical media make particularly high demands on lubricants due to the high local temperatures caused by the laser beam. Such temperatures can reach as high as 350° C. Many conventional lubricants begin to degrade or vaporize at temperatures of from 165° C. to 300° C., depending on the functional end group and the molecular weight, reducing the amount available.

It would be useful to have a lubricant which would remain stable at temperatures exceeding 350° C., and which would bond to the surface of the recording medium, reducing migration and transfer to the recording head. It has now been discovered that a functionalized perfluoropolyether comprising multiple acrylate endgroups increases thermal stability and percentage of bonded lubricant percentage.

SUMMARY OF THE INVENTION

The invention provides a lubricant useful in magnetic recording media and optical recording media comprising a functionalized perfluoropolyether comprising multiple acrylate endgroups. More specifically, the lubricant of the invention is a functionalized perfluoropolyether comprising at least about two acrylate groups.

In one embodiment, the lubricant of the invention is a functionalized perfluoropolyether comprising at least about three acrylate groups. Perfluoropolyether tetraacrylates having molecular weights of from about 2000 to about 3000 are considered particularly useful.

In another embodiment, the lubricant of the invention is a perfluoropolyether tetraacrylate.

The invention further comprises a magnetic recording medium comprising a thin metal magnetic recording layer, said layer having a coating of the functionalized perfluoropolyether lubricant comprising at least about two acrylate end groups.

The invention further provides an optical recording medium comprising at least one magneto-optical layer disposed between two protective layers, said protective layers being disposed between two substrate layers having interior and exterior surfaces, the exterior surface of at least one substrate layer bearing thereon a functionalized perfluoropolyether lubricant comprising a perfluoropolyether tetraacrylate.

In one embodiment, the functionalized perfluoroether has the formula:

$$AcCH_2CHAcCH_2OCH_2CF_2O(CF_2CF_2O)_p(CF_2O)_q$$
$$CF_2CH_2OCH_2CHAcCH_2Ac$$

wherein Ac is OCOCHCH$_2$, p is an integer of from about 3 to about 9 and q is an integer of from about 2 to about 5.

These terms when used herein have the following meanings.

1. The term "coating composition" means a composition suitable for coating onto a substrate.
2. The term "resistivity" means the surface electrical resistance measured in Ohms/square.
3. The terms "layer" and "coating" are used interchangeably to refer to a coated composition.
4. The term "lubricant" means a substance introduced between two adjacent solid surfaces, at least one of which is capable of motion, to produce an antifriction effect between the surfaces.

All weights, amounts and ratios herein are by weight, unless otherwise specifically noted.

DETAILED DESCRIPTION OF THE PREFERRED EMBODIMENTS

The following detailed description describes certain embodiments and is not to be taken in a limiting sense. The scope of the present invention is defined by the appended claims.

The lubricant comprises a functionalized perfluoropolyether comprising at least a perfluoropolyether diacrylate.

The magnetic recording medium includes a thin metal magnetic recording layer and at least one thin film layer not having an information recording function.

The optical recording medium includes a thin film of magneto-optical material disposed between two protective layers, which are further disposed within two substrate layers. The lubricant is placed atop the thin film layer.

The various components are described in greater detail below.

The Lubricant

Lubricants are commonly placed atop magnetic layers of tape magnetic recording media and thin film magneto-optical layers of optical recording media. Thermal or ultraviolet (UV) treatment after application is common to increase the amount of lubricant that is attached or bonded to the surface. The amount of bonded lubricant is important as nonbonded lubricant can be removed by solvent washing during the processing or transferred to the recording head during use. Conventional lubricants have bonded percentages of 35%-45%, some up to about 58%.

The new lubricant of the invention is a functionalized perfluoropolyether containing at least two acrylate groups. One new lubricant comprises a perfluoropolyether tetraacrylate. This lubricant has a high bonded value even without any UV treatment to increase the bonded percentages, but may have such a treatment if desired to even further increase the bonded percentage. Bonded percentages where the lubricant coat is not treated are at least about 75%, while bonded percentages of treated lubricant coatings can be 90% or more. It is believed that the functional endgroups give increased thermal stability and bonding of the lubricant, as well as the ability to homopolymerize to a crosslinked lubricant layer.

In a preferred embodiment, the functionalized perfluoroether has the formula:

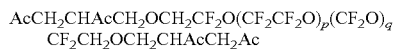

wherein Ac is $OCOCHCH_2$. Preferred tetraacrylates have p values of from 3 to about 9, and q values of from about 2 to about 5. Perfluoropolyether tetraacrylates having molecular weights of from about 2000 to about 3000 are considered particularly useful.

Magnetic Recording Media

The thin film magnetic recording media of the invention typically comprise several thin films coated in sequence which form a "thin film stack." The first thin film stack layers coated generally function to provide a combination of adhesion, topographical texture, and crystalline texture. These layers are then followed by one or more magnetic thin films which do the actual information storage. The magnetic thin films are followed by one or more coatings which provide environmental stability, hardness, and compatibility with the subsequently coated lube. The lubricant layer constitutes the final layer of the thin film media.

One representative thin film stack includes an adhesion-promoting layer such as chromium or titanium which is coated first, followed by one or more sublayers, which are coated to provide the desired topographical texture. The sublayer could also be chromium or titanium, or it can be formed of materials such as chromium-titanium, cobalt-chromium, or zirconium. Next, a seed layer is coated to promote the desired crystalline structure of the subsequently coated magnetic layer. Useful seed layers include such alloyed materials as chromium-titanium, chromium-vanadium, and nickel-aluminum alloys. The magnetic layer is generally a magnetic alloy of cobalt such as cobalt-chromium-tantalum, cobalt-chromium-platinum, cobalt-chromium-nickel, and the like. The magnetic layer has longitudinally oriented magnetic domains. A hard coat such as carbon, carbon nitride, or diamond-like carbon is then coated for environmental stability, hardness, and durability in the head-disk-interface (HDI) environment.

When all of the vacuum deposited layers have been coated, finishing processes such as polishing, burnishing and degreasing are performed. The lubricant is then applied by a conventional method. Lubricant performance can be very sensitive to the application conditions such as temperature, presence of ultraviolet radiation, and presence of water molecules on the hard coat surface. The lubricant compound may be dissolved in a solvent and the thin film medium dipped in the lubricant solution for a sufficient time to allow the solution to contact the surface and then drained, or the lubricant solution may be pumped over the recording medium and then allowed to drain.

The lubricant coat may be subjected to an ultraviolet surface treatment in order to increase the percentage of lubricant which is bonded to the surface.

Optical Recording Media

Optical recording media according to the invention store information in a thin film of magneto-optical material. This material is disposed between two protective layers to protect the magneto-optical material from corrosion. Surrounding the protective layers are the substrate layers for the medium, which are typically formed of glass or transparent polymer material. The surfaces of the substrate layers are typically scored with guide grooves, such grooves having a substantially uniform depth of less than a micron. The grooves are spaced concentrically at intervals of about one or two microns. The magneto-optical layers may be formed with any suitable materials exhibiting magneto-optical effects, e.g., amorphous vertically magnetized film based on rare earth transition metals, as these materials provide large magneto-optical effects. Dielectric layers are also present to enhance the apparent magneto-optical effects by providing interference between various layers of the optical medium. Reflective layers are provided to increase the reflectance of the medium and increase the read back signal output from the optical recording medium. Useful reflective layers include gold, aluminum or alloys thereof.

Optical recording media according to the invention may be formed on a transparent substrate by successively laminating layers thereon or by vacuum film forming operations such as sputtering and vapor deposition. The first layer deposited is typically a dielectric layer, followed by one or more magnetic recording layers, at least one reflective layer, the protective layers, and the like until all layers are coated. The surface of the disk is then cleaned and/or surface treated so as to be free of impurities. This assists in bonding of the lubricant to the surface of the disk. The disk may be cleaned with a mild solvent or treated by means of oxygen plasma for a period of a few seconds prior to application of the lubricant.

There are several methods of application of the lubricant compound to the surface of the optical recording medium. The compound may be dissolved in a solvent and the optical medium is then completely submerged in the lubricant solution for a sufficient time to allow the solution to contact the surface, and then drained. Another method for coating the recording medium involved pumping lubricant solution over the recording medium and then allowing it to slowly drain away.

EXAMPLES

Lubricants having differing end group functionality were tested to determine percent bonding. The lubricated disk is soaked in the same solvent used in the lubrication solution. The TGA onset temperatures show the point where significant weight loss began to occur. The percent bonding was calculated for various of the lubricants on one or both of two different types of disks: one type of disk was surface treated with ultraviolet rays to increase the percent of the lubricant composition bonded to the surface, a second type of disk was not treated with the ultraviolet rays.

As can be seen, the lubricant according to the present invention provided significantly more bonded lubricant, both on untreated disks and on disks treated with ultraviolet rays, than the other lubricants tested.

TABLE 1

| Ex. | Lubricant | Endgroups | Percent Bonding (With UV) | Percent Bonding (Nontreated) | TGA Onset Temp |
|---|---|---|---|---|---|
| 1 | AM 3001 | Piperonyl | 58 | 35 | 340 |
| 2 | ZDA | Diacrylate | 80 | 65 | |
| 3 | ZTA | Tetraacrylate | 95 | 75 | 412 |
| 4 | Zdol ® 2000 | Di-hydroxy | 39 | 32 | 215 |
| 5 | Zdol ® 4000 | Di-hydroxy | 41 | | 315 |
| 6 | Low MW Krytox ® | Di-hydroxy | | | 172 |
| 7 | High MW Krytox ® | Di-hydroxy | | | 169 |
| 8 | Krytox 143AA | None | | 38 | 212 |

Lubricant Transfer Testing

Disks coated with various lubricants were then tested for lubricant transfer to a burnish or recording head. As can be seen, AM3001 gives evidence of lubricant transfer both with and without ultraviolet (UV) treatment after 10 burnish passes. This lubricant responds to UV treatment and increases the percentage bonded, but such increase is only to about 50-70%, wherein the lubricant of the invention provides more than this percentage bonding level, a level of 75% bonded without UV treatment and increases to more than 90% with a ten second exposure to UV radiation. It is apparent from this data that 50% bonding is not adequate to prevent transfer, but that 75% in the case of the ZTA is adequate to prevent lubricant transfer. This will allow the elimination of this process step. The lubricant of the invention shows no transfer even with very thick lubricant layers where AM 3001 begins to show transfer at about 12 Angstroms.

TABLE 2

| Lubricant Percentage | Angstroms | Lube Transfer Ten Pass Burnish Non UV treated |
|---|---|---|
| 0.05 AM 3001 | 3.7 | Ok |
| 0.2 AM 3001 | 8.5 | Ok |
| 0.25 AM 3001 | 12.0 | 1 large drop |
| 0.30 AM 3001 | 16.0 | 1 large drop |
| 0.05 ZTA | 16.2 | Ok |
| 0.10 ZTA | 18.9 | Ok |
| 0.15 ZTA | 22.3 | Ok |
| 0.20 ZTA | 24.2 | Small debris |
| 0.25 ZTA | 26.1 | Very small ridge |

What is claimed is:

1. An optical recording medium comprising at least one thin film of magneto-optical material disposed between two protective layers, wherein the surface of said optical recording medium has a lubricant deposited thereon, wherein said lubricant is a functionalized perfluoropolyether tetraacrylate having a molecular weight of from about 2000 to about 3000.

2. An optical recording medium according to claim 1 wherein said lubricant is subjected to ultraviolet rays after deposition on said thin film.

3. A magnetic recording medium comprising at least one thin film of magneto-optical material disposed between two protective layers, wherein the surface of said optical recording medium has a lubricant deposited thereon, wherein said lubricant is a functionalized perfluoropolyether lubricant comprising a perfluoropolyether tetraacrylate having the formula

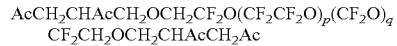

wherein Ac is $OCOCHCH_2$, p is an integer of from about 3 to about 9 and q is an integer of from about 2 to about 5.

4. A magnetic recording medium comprising at least one thin metal recording layer, said layer having a lubricant deposited thereon, wherein said lubricant is a functionalized perfluoropolyether tetraacrylate having a molecular weight of from about 2000 to about 3000.

5. A magnetic recording medium comprising at least one thin metal recording layer, said layer having a lubricant deposited thereon wherein said lubricant is a functionalized perfluoropolyether lubricant comprising a perfluoropolyether tetraacrylate having the formula

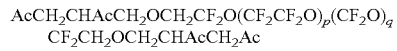

wherein Ac is $OCOCHCH_2$, p is an integer of from about 3 to about 9, and q is an integer of from about 2 to about 5.

6. A magnetic recording medium according to claim 4 wherein said medium comprises a thin film stack, said stack comprising multiple thin film layers, at least one layer thereof not having an information recording function.

* * * * *